United States Patent [19]
Lord

[11] 3,983,902

[45] Oct. 5, 1976

[54] MEANS FOR MOUNTING A DIAPHRAGM IN AN ACCUMULATOR-RESERVOIR DEVICE

[75] Inventor: Thomas J. Lord, Dayton, Ohio

[73] Assignee: United Aircraft Products, Inc., Dayton, Ohio

[22] Filed: Dec. 5, 1974

[21] Appl. No.: 530,011

[52] U.S. Cl. .................................. 138/30; 92/98 R; 220/85 B

[51] Int. Cl.$^2$ .......................................... F16L 55/04

[58] Field of Search .......... 138/30; 277/207 A, 208, 277/215; 92/98 R, 98 D, 92; 29/469, 454; 220/85 B

[56] References Cited

UNITED STATES PATENTS

| | | | |
|---|---|---|---|
| 2,401,792 | 6/1946 | Overbeke | 138/30 |
| 2,740,259 | 4/1956 | Westlund | 138/30 X |
| 2,838,073 | 6/1958 | Di Mattia et al. | 138/30 |
| 2,893,433 | 7/1959 | MacDuff | 138/30 |
| 2,908,294 | 10/1959 | Mattia et al. | 138/30 |
| 3,654,964 | 4/1972 | Mercier et al. | 138/30 |
| 3,668,871 | 6/1972 | Berndt et al. | 60/54.5 |
| 3,752,942 | 8/1973 | McAfee | 92/98 D X |
| 3,788,358 | 1/1974 | Taki | 138/30 |

*Primary Examiner*—Richard E. Aegerter
*Assistant Examiner*—James E. Bryant, III
*Attorney, Agent, or Firm*—J. E. Beringer

[57] ABSTRACT

A means for mounting a diaphragm in an accumulator-reservoir device or the like in which the gland receiving the diaphgram bead has faces formed to oppose such pull on the bead as will break the sealing contact between gland faces and the bead. Back draft angles and grooved surfaces are used in conjunction with an initial applied compression to fix the bead in place in the gland.

3 Claims, 5 Drawing Figures

MEANS FOR MOUNTING A DIAPHRAGM IN AN ACCUMULATOR-RESERVOIR DEVICE

BACKGROUND OF THE INVENTION

This invention relates to accumulator-reservoir type devices in which hydraulic or pneumatic pressures, or a combination of the two, are transmitted through a flexible diaphragm. The diaphragm has a bead at its periphery accommodated in a gland formed usually at mating ends of housing or shell sections. When the shell sections are bolted together, the diaphragm bead is fully contained in the gland. An annular opening in the gland allows the diaphragm wall adjacent to the bead to pass therethrough.

While the described structure is capable of anchoring the diaphragm bead and of effecting a seal at the provided joint it is so operable within a relatively low pressure range. Higher pressures exert an excessive pull on the diaphragm, causing bead portions to relax from or to move away from faces of the gland, breaking sealing contact therewith. In the past, high pressure requirements have been met by incorporating relatively massive flanges in the reservoir housing and heavily clamping a peripheral diaphragm portion between the flanges. Such a recourse is inconsistent with design objectives in aircraft and like accessories which favor small, lightweight constructions.

SUMMARY OF THE INVENTION

The instant invention obviates problems of mass and weight in high pressure accumulator-reservoir devices in that it provides for greater security in a conventional gland construction. Thus the invention proposes a change in gland configuration to improve the ability of a formed joint to withstand leakage at higher pressures. The change includes that of providing back draft angles which result in the diaphragm bead becoming wedged in the gland in a sealing relation to gland faces. Further, at least certain gland faces are concentrically grooved to increase the grip on the bead and prevent its slipping into the annulus through which the diaphragm bead connects to the diaphragm wall.

An object of the invention is to provide a means for mounting a diaphragm substantially as indicated above.

Other objects and structural details of the invention will appear from the following description, when read in conjunction with the accompanying drawings, wherein.

Figure 1:
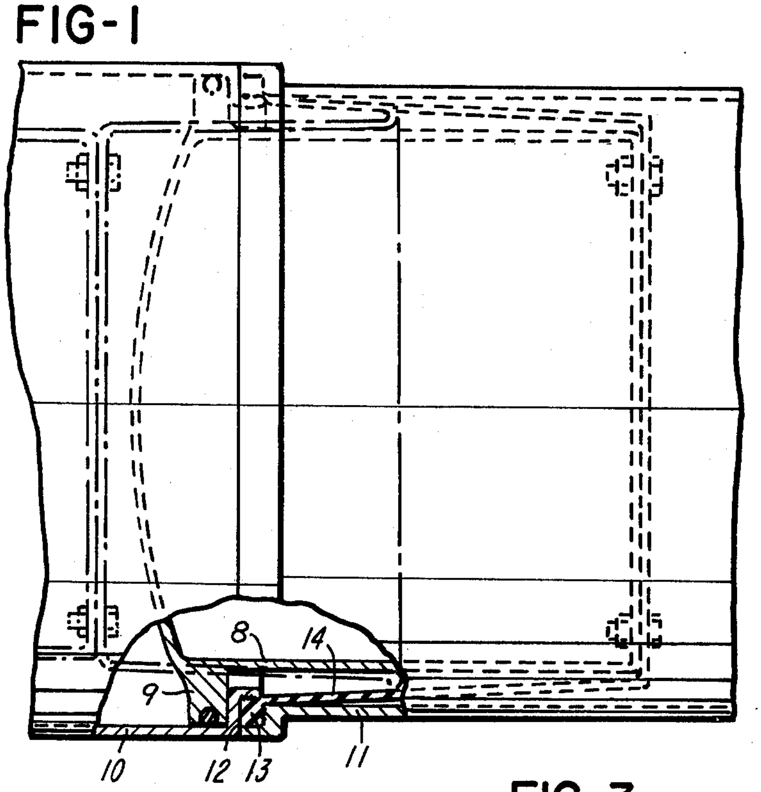
FIG. 1 is a fragmentary view of an accumulator reservoir device, partly broken away to show an installed diaphragm.

Referring to the drawings, an accumulator-reservoir or like device, in accordance with the illustrative embodiment of the invention, includes a housing comprised of separable sections 10 and 11. Opposing ends of sections 10 and 11 have mating configurations forming a gland 12. Received in gland 12 is a bead portion 13 of a diaphragm 14. The latter is made of flexible material substantially impermeable to fluids, and, in the illustrated instance, has a bell-like shape enabling it to extend from gland 12 into either section 10 and 11. The diaphragm thus has an open mouth defined by bead portion 13 and has a relatively projected closed end which is movable in both directions past gland 12, with the diaphragm wall adjacent the gland flexing to allow such movement. Diaphragm 14 accordingly is a "rolling" diaphragm. In a manner which it is unnecessary here to consider, the closed end of the diaphragm fastens to a projected piston skirt 8 movable into and out of housing sections 10 and 11. Fluid pressure, generated either as a result of movement of a piston 9, or to effect piston movement, is applied in the housing in a manner to place the diaphragm 14 in tension with the applied pressures attempting to pull bead portion 13 from gland 12.

Referring more particularly to the gland 12, end section 10 has an inturned wall 15 terminating in a projecting lip 16 inwardly offset from but parallel to the wall of section 10. The extremity of lip 16 is formed with a full radius. Its outer peripheral surface is cut by a series of concentric grooves 17. Further, such outer surface is formed with a back draft angle, that is, from the outer terminus of its arcuately formed extremity toward its base or root portion, lip 16 on its outer surface inclines slightly towards the housing axis.

End section 11 has outturned wall 18 terminating in a projecting lip 19 outwardly offset from but parallel to the wall of section 11. What may be regarded as a forwardly facing surface of wall 18 is formed with a series of concentric grooves 21. The same surface is formed with a back draft angle, that is, from an accurately formed terminus of section 11 toward the base of lip 19, such surface declines out of a plane perpendicular to the housing axis.

In an assembled position of the parts, the mating end sections define a rectangular gland 12 having four faces 22, 23, 24 and 25. The concentrically grooved surfaces comprise faces 23 and 25 respectively and appear on opposite sides of an annular space 26 accommodating passage therethrough of the diaphragm wall. In this connection, the height of wall 15 is such, and the length of lip 19 is such, that a relative approaching motion of the housing sections causing lip 19 to limit against section 10 will still find lip 16 separated from and slightly offset relative to the adjacent end of section 11. Arcuate configurations on the lip 16 and on the adjacent end of section 11 define the space 26 which may be regarded as an outlet opening from gland 12.

The bead portion 13 is a generally bulbous member normally of a volume equal to the volume of gland 12. An extremity 27 thereof is flat or substantially perpendicular to the diaphragm axis. Such extremity is connected to the diaphragm wall by oppositely curving convex portions 28 and 29. A flange-like extension 31 of extremity 27 marks the terminus of fabric reinforcements (not shown).

Figure 2:
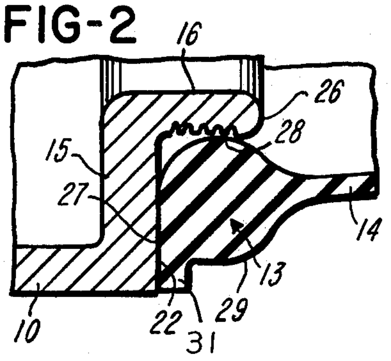
FIG. 2 is a view showing a diaphragm bead in place in a housing or shell section, prior to completing of an assembly by bringing shell sections together to compress the bead.
Figure 3:
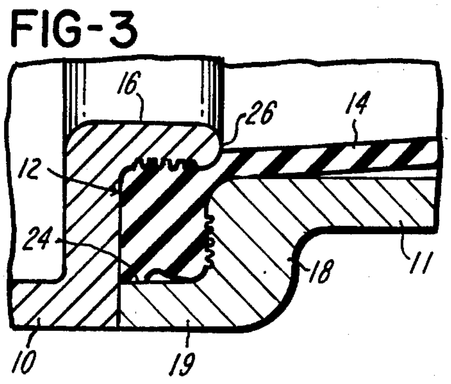
FIG. 3 is a view relatively enlarged with respect to FIG. 1, showing an installed diaphragm bead.
Figure 4:
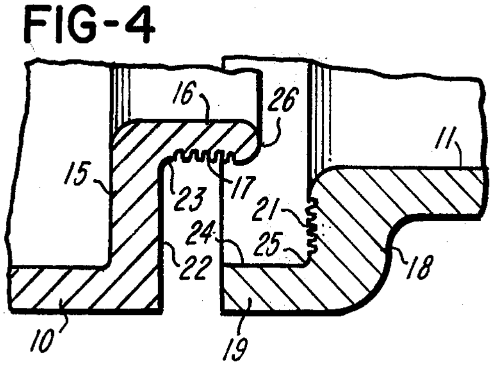
FIG. 4 is a fragmentary view showing means forming a gland in a relative approaching position of the parts.
Figure 5:
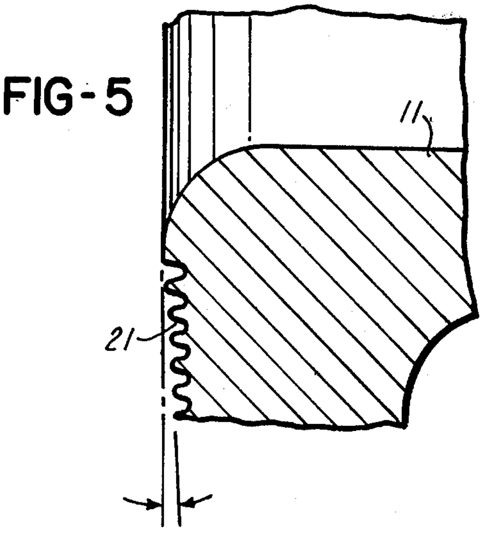
FIG. 5 is a fragmentary view, enlarged with respect to FIG. 4, showing a portion of one gland face.

In assembling the diaphragm to the housing, the mouth of the diaphragm is advanced upon section 10 until the flat extremity 27 seats to wall 15 or more specifically to gland face 22 thereon. The parts under these conditions assume a position as shown in FIG. 2. Section 11 is then caused to approach section 10, and, in the course of such movement, bead 13 is received within lip 19. Such approaching motion is continued until limited by the resistance of the bead or until lip 19 contacts section 10, with the parts then assuming a position substantially as shown in FIG. 3. Bolts (not shown) or other means are applied to hold the parts in an assembled relation. The diaphragm has been described as a flexible member but has more particularly a resilient, deformable construction. Accordingly, when housing section 11 is advanced upon a bead seated to wall 15, pressurally deforming forces are exerted urging portions of the bead into close fitting, sealing contact with gland faces. Under fully applied pressure, with lip 19 limiting against section 10, the bead substantially fills the gland and applies reactant pressure to the gland faces. In the illustrated instance, interior fluid pressure is applied in the housing between piston skirt 8 and diaphragm 14. In the gland, therefore, faces 22 and 23 become sealing surfaces and the latter can be regarded as a primary sealing surface since it is immediately adjacent the source of pressure within the housing.

Thus, close pressural contact of the surfaces 22 and 23 by the bead material effectively seals the joint defined by gland 12 against the escape of pressure fluid from the accumulator reservoir housing. Placing of the diaphragm in tension, as is done in operation of the device, exerts a pull on the bead attempting to extrude or to withdraw it through outlet opening 26. Unless counteracted, or properly resisted, higher applied tension causes bead portions to relax from gland sealing surfaces and allows leakage from the device at the gland location. In the present instance, installation of the bead reforms convex portions 28 and 29 thereof into close conforming relation to grooved, angled faces 23 and 25. These faces enforce a wedge-like shape upon the bead offering positive resistance to the slipping of the bead to and through opening 26. In addition, portions of the bead material flow into concentric grooves 17 and 21, adding to the tight grip with which the bead is held in the gland. As a result, a diaphragm mounted in accordance with the present invention is strongly resistant to dislodging and is capable of useful service at pressure levels well above previous limits. By increasing pressure capability of the gland, a smaller diameter and lighter weight joint is possible than has heretofore been used in higher pressure installations.

The diaphragm mounting means has been described as having special reference to accumulator reservoir devices utilizing diaphragms of the rolling type. It will be apparent, however, that the invention has general application to diaphragms in pressure vessels.

The back draft angles on the gland faces 23 and 25 are formed by undercutting, and the degree of undercut may vary with different installations and with the thickness of formed parts. In the illustrated instance face 25 is undercut on the order of 5°, while the degree of undercut of face 23 is substantially smaller as on the order of 1° to 2°.

The invention has been disclosed with respect to particular embodiments. Structural modifications obvious to a person skilled in the art to which this invention relates are considered to be within the intent and scope of the invention.

What is claimed is:

1. An accumulator-reservoir device including a beaded diaphragm, wherein a housing defining the walls of said device is comprised of separable sections opposing ends of which have a mating configuration forming a gland to receive the diaphragm bead, a relative approaching motion of the housing sections confining the diaphragm bead in said gland under pressure to achieve a sealing contact with plural gland faces and there being an annular opening from said gland through which a portion of the diaphragm wall adjacent to said bead extends, opposing ends of said housing sections terminating in laterally offset projecting generally cylindrical lips received one within another in a radially spaced concentric relation to define a gland of rectangular configuration having angularly related interior faces, said annular opening separating a first face on the outer periphery of a radially inwardly positioning one of said lips and a second face on the housing section terminating in a radially outwardly positioning one of said lips, said first face inclining from the extremity of said inwardly positioning lip toward the common axis of said cylindrical lips and said second face declining out of a plane perpendicular to said common axis.

2. An accumulator-reservoir device according to claim 1, wherein said first and second gland faces have differential angles.

3. An accumulator-reservoir device according to claim 1, wherein said diaphragm bead is a generally bulbous member normally of a volume substantially equal to the volume of said gland, an extremity of said bead being substantially perpendicular to the diaphragm axis and being connected to the diaphragm wall by oppositely curving convex portions.

* * * * *